United States Patent
Qiu et al.

(10) Patent No.: US 8,411,431 B2
(45) Date of Patent: Apr. 2, 2013

(54) ELECTRONIC DEVICE HAVING HEAT DISSIPATION AIRFLOW PATH

(75) Inventors: Ji-Feng Qiu, Shenzhen (CN); Hong Li, Shenzhen (CN); Xiao-Hui Zhou, Shenzhen (CN); Hai-Tao Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 205 days.

(21) Appl. No.: 13/095,943

(22) Filed: Apr. 28, 2011

(65) Prior Publication Data

US 2012/0170206 A1    Jul. 5, 2012

(30) Foreign Application Priority Data

Dec. 31, 2010    (CN) .......................... 2010 1 0616833

(51) Int. Cl.
*G11B 33/14*  (2006.01)
*H05K 7/20*  (2006.01)

(52) U.S. Cl. ......... 361/679.49; 361/679.01; 361/679.46; 361/679.55; 361/695; 165/80.3; 165/104.33; 165/122; 165/126; 165/185; 454/184; 369/44.14; 369/44.15; 369/75.1; 720/600; 720/601; 720/603; 720/649

(58) Field of Classification Search ............. 361/679.01, 361/679.46–679.55, 690–695; 454/184; 165/80.3, 104.33, 121–126, 185; 720/600, 720/601, 603, 646–652, 671; 369/44.14, 369/44.15, 75.1–82
See application file for complete search history.

(56) References Cited

U.S. PATENT DOCUMENTS

| | | | |
|---|---|---|---|
| 6,426,932 B2 * | 7/2002 | Omori et al. .................. | 720/648 |
| 7,543,310 B2 * | 6/2009 | Shizuya et al. ............... | 720/601 |
| 7,739,702 B2 * | 6/2010 | Soeda et al. .................. | 720/649 |
| 7,937,721 B2 * | 5/2011 | Watabe et al. ................ | 720/649 |
| 8,095,945 B2 * | 1/2012 | Isoshima et al. .............. | 720/649 |
| 2001/0046128 A1 * | 11/2001 | Ogata .......................... | 361/800 |
| 2006/0184951 A1 * | 8/2006 | Shizuya et al. ............... | 720/601 |
| 2007/0220534 A1 * | 9/2007 | Abe et al. ...................... | 720/649 |
| 2010/0031277 A1 * | 2/2010 | Kirihara et al. ............... | 720/601 |

FOREIGN PATENT DOCUMENTS

| | | | |
|---|---|---|---|
| JP | 02004310883 A | * | 11/2004 |
| JP | 2006107602 A | * | 4/2006 |
| JP | 2007172799 A | * | 7/2007 |

* cited by examiner

*Primary Examiner* — Michail V Datskovskiy
(74) *Attorney, Agent, or Firm* — Altis Law Group, Inc.

(57) ABSTRACT

An exemplary electronic device includes a cover, a motherboard and a driving module both disposed at an inner side of the cover, an electronic component fixed on the motherboard, and a fan duct mounted on the motherboard and covering the electronic component. The driving module has a rotating shaft for supportively driving an optical disk rotating. The fan duct guides hot air therein toward the driving module.

20 Claims, 7 Drawing Sheets

ELECTRONIC DEVICE HAVING HEAT DISSIPATION AIRFLOW PATH

BACKGROUND

1. Technical Field

The disclosure relates to electronic devices, and particularly to an electronic device facilitating heat dissipation.

2. Description of Related Art

Nowadays, with the development of electronics technology, an electronic device such as a Digital Video Disc (DVD) player is devised to be much thinner and smaller than before, yet hold many more electronic modules. However, the electronic modules generate a large amount of heat during operation. The interior space of the electronic device is very limited, and the electronic modules occupy much of that space, which results in heat generated by the electronic modules accumulating rather than being dissipated in time.

What is needed, therefore, is an electronic device which can overcome the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
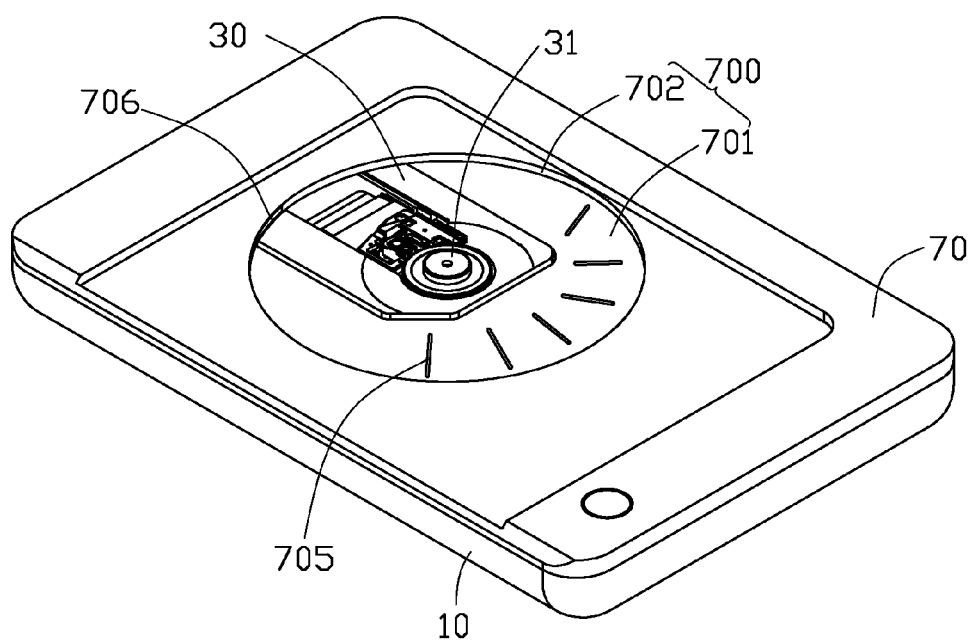
FIG. 1 is an isometric, assembled view of an electronic device in accordance with one embodiment of the disclosure.
Figure 2:
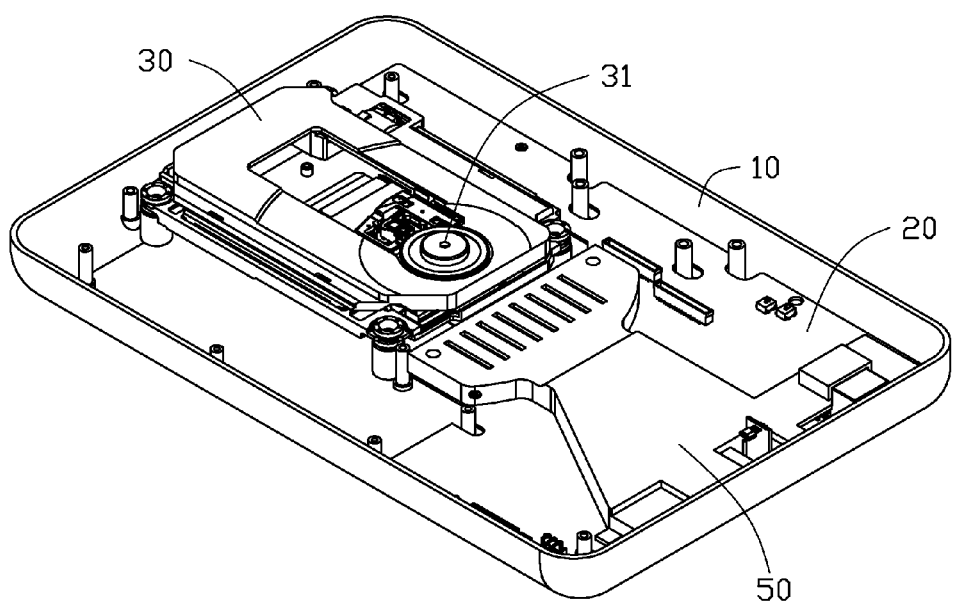
FIG. 2 is similar to FIG. 1, but with a top cover of the electronic device omitted.
Figure 3:
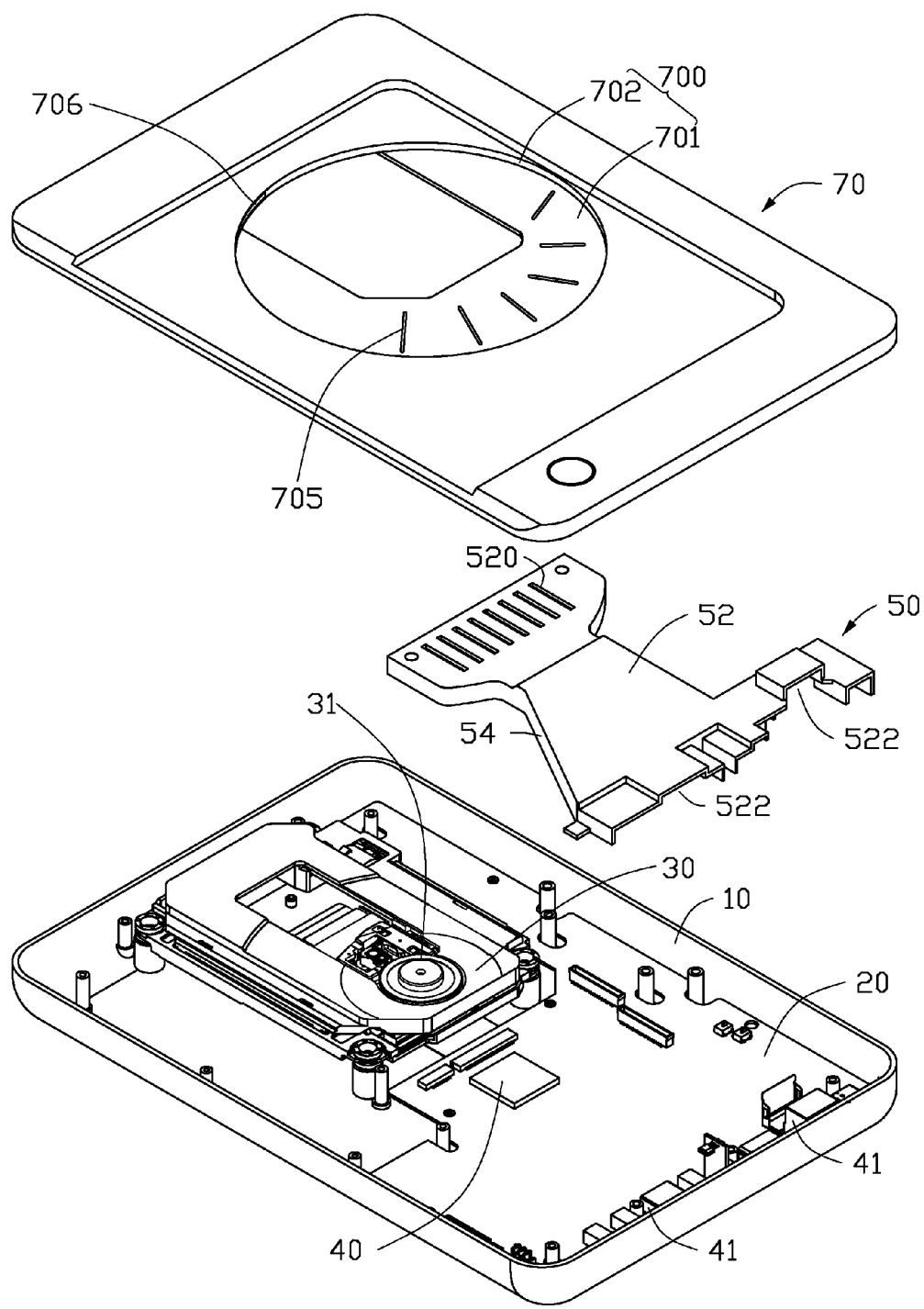
FIG. 3 is an exploded view of the electronic device of FIG. 1.

Referring to FIGS. 1-3, an electronic device in accordance with an embodiment of the disclosure includes a bottom cover 10, a motherboard 20, a driving module 30, an electronic component 40, a fan duct 50, and a top cover 70. The top cover 70 and the bottom cover 10 are assembled together and receive the motherboard 20, the driving module 30, the electronic component 40, and the fan duct 50 therein. The electronic component 40 is arranged on a top side of the motherboard 20. The fan duct 50 covers the electronic component 40 and is aligned with the driving module 30. In this embodiment, the electronic device is a DVD player.

The electronic component 40 generates heat during operation, and is disposed at an end of the motherboard 20 near the driving module 30. A plurality of connectors 41 are disposed at another end of the motherboard 20 away from the driving module 30.

Figure 4:
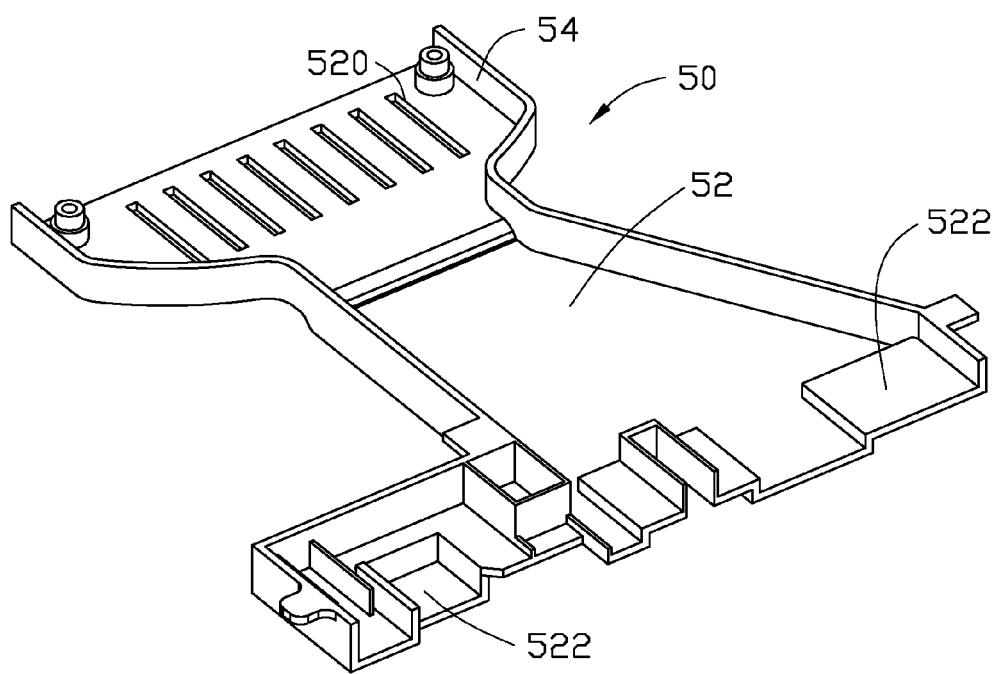
FIG. 4 is an inverted, enlarged view of a fan duct of the electronic device of FIG. 3.

Also referring to FIG. 4, the fan duct 50 is integrally formed as a single piece and made of plastic. The fan duct 50 includes a body 52 parallel to the motherboard 20, and two side walls 54 perpendicularly and downwardly extending from two opposite sides of the body 52 toward the motherboard 20. The electronic component 40 is received in the fan duct 50. The body 52 defines a plurality of parallel elongated through holes 520 in an end thereof near the driving module 30, corresponding to the electronic component 40. That is, in the illustrated embodiment, the through holes 520 are in the form of through slots. A plurality of receiving portions 522 are formed at another end of the body 52 away from the driving module 30. The receiving portions 522 receive the connectors 41 therein for preventing the connectors 41 from moving when subjected to external force.

Figure 5:
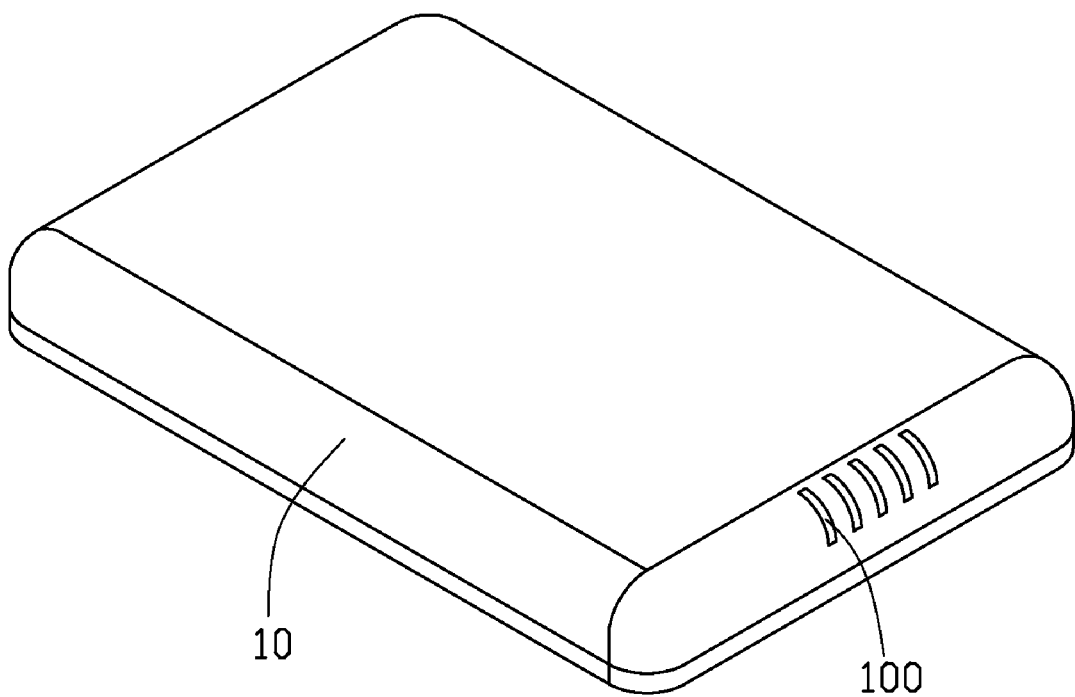
FIG. 5 is an inverted view of the electronic device of FIG. 1.

Also referring to FIG. 5, the bottom cover 10 defines a plurality of elongated ventilation holes 100 in a side thereof for cooling air from the ambient environment to flow therethrough. That is, in the illustrated embodiment, the ventilation holes 100 are in the form of through slots. The driving module 30 extends from a side of the bottom cover 10 away from the ventilation holes 100, to a middle of the bottom cover 10. The driving module 30 has a rotating shaft 31, which is located near the middle of the bottom cover 10. The electronic component 40 is located between the rotating shaft 31 and the ventilation holes 100 of the bottom cover 10. The electronic component 40, the rotating shaft 31, and the ventilation holes 100 are substantially aligned along a same longitudinal axis of the bottom cover 10.

Figure 6:
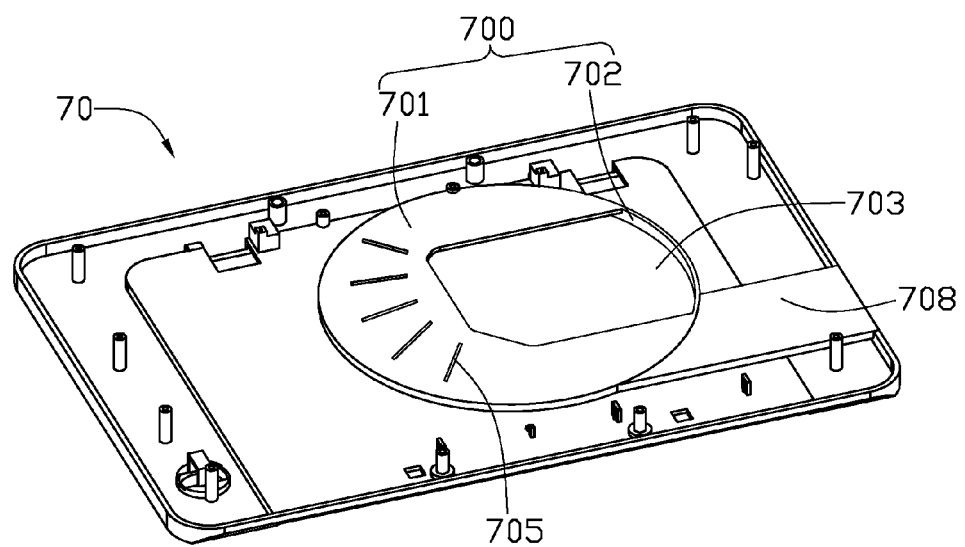
FIG. 6 is an isometric, inverted view of a top cover of the electronic device of FIG. 1.

Also referring to FIG. 6, a circular concave portion 700 is inwardly formed at a middle of the top cover 70. The central axis of the concave portion 700 coincides with the rotating shaft 31 of the driving module 30. The concave portion 700 includes a circular bottom wall 701 parallel to the top cover 70, and a side wall 702 connecting an outer edge of the bottom wall 701 with the top cover 70. The bottom wall 701 of the concave portion 700 defines a cutout 703, corresponding to the rotating shaft 31 of the driving module 30. The rotating shaft 31 extends through the cutout 703 of the concave portion 700, and a top end of the rotating shaft 31 is coplanar with a top face of the top cover 70. A plurality of elongated through holes 705 are defined in a side of the bottom wall 701 opposite to the cutout 703. That is, in the illustrated embodiment, the through holes 705 are in the form of through slots. The through holes 705 extend radially and are located over the through holes 520 of the fan duct 50. An air outlet 706 (shown in FIGS. 1 and 3) is defined in the side wall 702 of the concave portion 700. The top cover 70 forms an airflow pipe 708 corresponding to the air outlet 706 of the concave portion 700. The airflow pipe 708 extends from the air outlet 706 along a tangent direction of the concave portion 700 and communicates with an outer side of the top cover 70.

Figure 7:
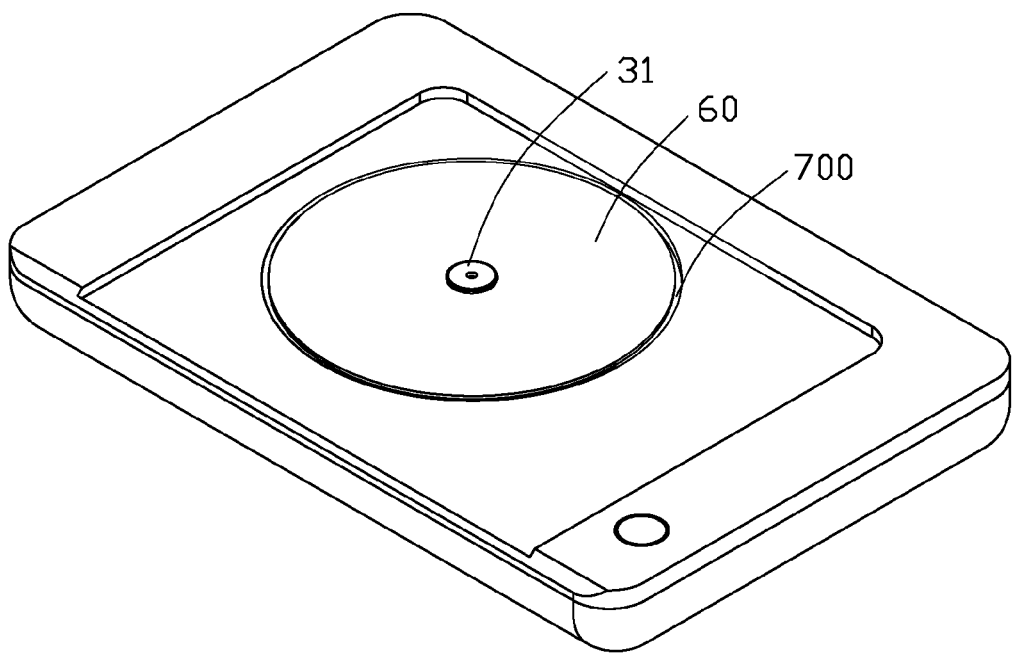
FIG. 7 is similar to FIG. 1, but showing an optical disk engaged on the electronic device.

Also referring to FIG. 7, in use, an optical disk 60 is mounted on the rotating shaft 31, and received in the concave portion 700. The electronic component 40 on the motherboard 20 generates heat during operation and heats the air in the fan duct 50. The air pressure below the concave portion 700 is smaller than the air pressure above the concave portion 700 due to the rotating of the optical disk 60. Thus the heated air in the fan duct 50 flows through the through holes 520 of the fan duct 50, and through the through holes 705 and the cutout 703 of the concave portion 700 and rotates following the rotating of the optical disk 60. When the heated air reaches the air outlet 706 of the concave portion 700, the heated air flows into and through the airflow pipe 708 to the outer side of the top cover 70. Cooling air in the ambient environment can flow through the ventilation holes 100 of the bottom cover 10 simultaneously to compensate the air pressure inside the fan duct 50. The electronic component 40 is thus cooled efficiently by the rotating of the optical disk 60 in such a manner.

It is believed that the disclosure and its advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device comprising:
a motherboard;
a driving module comprising a rotating shaft adapted for supportively driving an optical disk to rotate;
an electronic component mounted on the motherboard and generating heat during operation; and
a fan duct mounted on the motherboard and covering the electronic component, the fan duct guiding hot air therein toward the driving module.

2. The electronic device of claim 1, wherein the fan duct is integrally formed as a single piece and made of plastic.

3. The electronic device of claim 1, wherein the fan duct comprises a body, and two side walls extending from two sides of the body toward the motherboard.

4. The electronic device of claim 3, wherein the electronic component is disposed at an end of the motherboard near the driving module, the body of the fan duct defining a plurality of through holes in an end near the driving module, corresponding to the electronic component.

5. The electronic device of claim 4, wherein a plurality of connectors is disposed at another end of the motherboard away from the driving module, a plurality of receiving portions being formed at another end of the body of the fan duct away from the driving module, the connectors being received in the receiving portions.

6. The electronic device of claim 1, further comprising a top cover and a bottom cover assembled together and receiving the driving module, the motherboard, the electronic component and the fan duct therein, the top cover defining a cutout, the rotating shaft extending through the cutout, a plurality of through holes being defined in a side of the top cover opposite to the cutout.

7. The electronic device of claim 6, wherein a circular concave portion adapted for receiving the optical disk is inwardly formed at the top cover, the central axis of the concave portion coinciding with the rotating shaft of the driving module.

8. The electronic device of claim 7, wherein the concave portion comprises a circular bottom wall and a side wall connecting an outer edge of the bottom wall with the top cover.

9. The electronic device of claim 8, wherein the cutout and the through holes are respectively defined in two opposite sides of the bottom wall of the concave portion.

10. The electronic device of claim 6, wherein the bottom cover defines a plurality of ventilation holes, the electronic component is located between the rotating shaft and the ventilation holes of the bottom cover.

11. An electronic device comprising:
a bottom cover;
a circuit board;
a driving module having a rotating shaft adapted for supportively driving an optical disk to rotate;
a top cover covering the bottom cover, a circular concave portion adapted for receiving the optical disk being inwardly formed on the top cover;
an electronic component fixed on the circuit board and generating heat during operation; and
a fan duct mounted on the circuit board and covering the electronic component, the fan duct guiding hot air therein toward the driving module;
wherein the top cover and the bottom cover are assembled together and receive the driving module, the circuit board, the electronic component and the fan duct therein.

12. The electronic device of claim 11, wherein the fan duct is integrally formed as a single piece and made of plastic.

13. The electronic device of claim 11, wherein the fan duct comprises a body, and two side walls extending from two sides of the body toward the circuit board.

14. The electronic device of claim 13, wherein the electronic component is disposed at an end of the circuit board near the driving module, the body of the fan duct defining a plurality of through holes in an end near the driving module, corresponding to the electronic component.

15. The electronic device of claim 14, wherein a plurality of connectors is disposed at another end of the circuit board away from the driving module, a plurality of receiving portions being formed at another end of the body of the fan duct away from the driving module, the connectors being received in the receiving portions.

16. An electronic device comprising:
a bottom cover defining a plurality of ventilation holes therein;
a motherboard and a driving module both positioned in an inner side of the bottom cover, the driving module having a rotating shaft adapted for driving an optical disk to rotate;
a top cover covering the bottom cover, the motherboard and the driving module, a circular concave portion adapted for receiving the optical disk being inwardly formed from the top cover, a plurality of through holes being defined in the circular concave portion, and an airflow pipe being defined in the top cover to communicate with an outer side of the top cover and the through holes of the circular concave portion;
an electronic component fixed on the motherboard and generating heat during operation; and
a fan duct mounted on the motherboard and covering the electronic component, one end of the fan duct communicating with the through holes of the circular concave portion, and another end of the fan duct communicating with the ventilation holes of the bottom cover;
wherein air heated by the electronic component in the fan duct can flow out of the top cover via the through holes and the airflow pipe, and rotation of the optical disk facilitates such airflow.

17. The electronic device of claim 16, wherein the airflow pipe extends along a tangent direction of the concave portion.

18. The electronic device of claim 16, wherein the fan duct comprises a body, and two side walls extending from two sides of the body toward the motherboard.

19. The electronic device of claim 18, wherein the electronic component is disposed at an end of the motherboard near the driving module, the body of the fan duct defining a plurality of through holes in an end near the driving module, corresponding to the electronic component.

20. The electronic device of claim 19, wherein a plurality of connectors is disposed at another end of the motherboard away from the driving module, a plurality of receiving portions being formed at another end of the body of the fan duct away from the driving module, the connectors being received in the receiving portions.

* * * * *